(12) United States Patent
Colton et al.

(10) Patent No.: US 10,185,057 B2
(45) Date of Patent: Jan. 22, 2019

(54) COATED ARTICLES HAVING ABRASION RESISTANT, GLASS-LIKE COATINGS

(71) Applicant: PPG Industries Ohio, Inc., Cleveland, OH (US)

(72) Inventors: James P. Colton, Trafford, PA (US); Mathias Maffei, Sant' Angelo in Vado (IT)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/672,033

(22) Filed: Nov. 8, 2012

(65) Prior Publication Data

US 2013/0122221 A1 May 16, 2013

Related U.S. Application Data

(60) Provisional application No. 61/558,635, filed on Nov. 11, 2011.

(51) Int. Cl.

| *G02B 1/14* | (2015.01) |
| *B32B 5/18* | (2006.01) |
| *B32B 9/04* | (2006.01) |
| *C09D 7/00* | (2018.01) |
| *C09K 19/52* | (2006.01) |
| *G02B 1/04* | (2006.01) |
| *G02B 1/10* | (2015.01) |

(52) U.S. Cl.
CPC .............. *G02B 1/14* (2015.01); *B32B 5/18* (2013.01); *B32B 9/04* (2013.01); *C09D 7/00* (2013.01); *C09K 19/52* (2013.01); *G02B 1/04* (2013.01); *G02B 1/105* (2013.01); *G02B 2207/109* (2013.01); *Y10T 428/1045* (2015.01); *Y10T 428/249982* (2015.04); *Y10T 428/249987* (2015.04); *Y10T 428/249991* (2015.04); *Y10T 428/249992* (2015.04)

(58) Field of Classification Search
CPC .... B32B 5/18; B32B 9/04; C09D 7/00; C09K 19/52; G02B 1/04; G02B 1/105; G02B 2207/109; G02B 1/14; Y10T 428/1045
USPC .......... 428/1.3–1.33, 1.5–1.54, 447; 349/137
See application file for complete search history.

(56) References Cited

U.S. PATENT DOCUMENTS

| 3,361,706 A | | 1/1968 | Meriwether et al. | |
| 4,273,826 A | * | 6/1981 | McCollister et al. | 428/310.5 |
| 4,590,117 A | * | 5/1986 | Taniguchi et al. | 428/212 |
| 4,830,879 A | * | 5/1989 | Debsikdar | B05D 5/061 |
| | | | | 136/256 |
| 4,931,220 A | | 6/1990 | Haynes et al. | |
| 5,116,644 A | * | 5/1992 | Asai et al. | 427/164 |
| 5,580,819 A | * | 12/1996 | Li et al. | 427/167 |
| 5,645,767 A | | 7/1997 | VanGemert | |
| 5,658,501 A | | 8/1997 | Kumar et al. | |
| 5,723,175 A | * | 3/1998 | Scholz et al. | 427/161 |
| 6,025,026 A | | 2/2000 | Smith et al. | |
| 6,150,430 A | | 11/2000 | Walters et al. | |
| 6,153,126 A | | 11/2000 | Kumar | |
| 6,264,859 B1 | * | 7/2001 | Basil | C09D 183/04 |
| | | | | 106/287.13 |
| 6,296,785 B1 | | 10/2001 | Nelson et al. | |
| 6,318,124 B1 | * | 11/2001 | Rutherford | H01L 21/02126 |
| | | | | 257/E21.243 |
| 6,348,604 B1 | | 2/2002 | Nelson et al. | |
| 6,353,102 B1 | | 3/2002 | Kumar | |
| 6,395,331 B1 | | 5/2002 | Yan et al. | |
| 2003/0150811 A1 | | 8/2003 | Walter et al. | |
| 2005/0266235 A1 | * | 12/2005 | Nakajima et al. | 428/336 |
| 2006/0241273 A1 | | 10/2006 | Bojkova et al. | |
| 2007/0142604 A1 | | 6/2007 | Bojkova et al. | |
| 2007/0142606 A1 | | 6/2007 | Bojkova et al. | |
| 2007/0270548 A1 | | 11/2007 | Bojkova et al. | |
| 2008/0241523 A1 | * | 10/2008 | Huignard et al. | 428/336 |
| 2009/0075092 A1 | | 3/2009 | Varaprasad | |
| 2009/0191391 A1 | * | 7/2009 | Naito et al. | 428/216 |
| 2010/0096009 A1 | * | 4/2010 | Funayama | C01B 33/18 |
| | | | | 136/256 |
| 2011/0000816 A1 | * | 1/2011 | Kato et al. | 206/568 |

FOREIGN PATENT DOCUMENTS

| JP | 2001138434 | | 5/2001 | |
| JP | 2002012452 | | 1/2002 | |
| JP | 2008007363 | | 1/2008 | |
| WO | WO 00/10934 | * | 3/2000 | C03C 17/00 |
| WO | WO 0010934 | | 3/2000 | |

OTHER PUBLICATIONS

Techniques in Chemistry, vol. III, "Photochromism", Chapter 3, Glenn H. Brown, Editor. John Wiley and Sons, Inc., New York, 1971.

* cited by examiner

*Primary Examiner* — Sophie Hon
(74) *Attorney, Agent, or Firm* — The Webb Law Firm

(57) ABSTRACT

Coated articles are provided comprising:
(a) a substrate;
(b) a porous sol-gel layer superimposed on at least one surface of the substrate; wherein the porous sol-gel layer comprises a hydrolyzed tetraalkoxysilane; and
(c) a sealant layer superimposed on at least one surface of the porous sol-gel layer; wherein the sealant layer comprises an alkyltrihalosilane. The coated articles demonstrate superior abrasion resistance due to a glass-like layer formed from the combination of the porous sol-gel layer and sealant layer.

12 Claims, No Drawings

COATED ARTICLES HAVING ABRASION RESISTANT, GLASS-LIKE COATINGS

FIELD OF THE INVENTION

The present invention relates to coated articles having abrasion resistant, glass-like coatings.

BACKGROUND OF THE INVENTION

Polymeric organic materials that typically are used to make optical elements, transparent sheets and films, often have surfaces that are susceptible to abrasion and chemical attack. To prevent damage, such materials may be coated with a protective coating to improve their abrasion resistance.

Numerous protective coatings of various chemistries have been developed in the optical art. For example, coatings that incorporate epoxy-containing silane monomers, aluminum compounds and other silane monomers have been described in the literature. Coatings prepared from a colloidal dispersion of a water-insoluble dispersant such as aluminum oxide in a water-alcohol solution of selected organotrialkoxysilanes have also been developed. Hard coat compositions such as epoxy group-containing difunctional alkoxysilanes, tetrafunctional silanes, colloidal titania or alumina and curing catalysts are also among the conventional systems. While each of these coatings provides adequate abrasion resistance to plastic substrates, the abrasion resistance of glass is still much greater than that of hard-coated plastic and is the ideal. Abrasion resistance approaching that of glass is particularly desired in rigorous environments such as those mobile phones, touch screens, and the like are exposed regularly.

It would be desirable to provide articles having coatings that provide abrasion resistance approaching that of glass while allowing for lower cost, light weight, impact performance, moisture barrier and easy removal.

SUMMARY OF THE INVENTION

The present invention is directed to coated articles comprising:

(a) a substrate;

(b) a porous sol-gel layer superimposed on at least one surface of the substrate; wherein the porous sol-gel layer comprises a hydrolyzed tetraalkoxysilane; and (c) a sealant layer superimposed on at least one surface of the porous sol-gel layer; wherein the sealant layer comprises an alkyltrihalosilane

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an" and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

By "polymer" is meant a polymer including homopolymers and copolymers, and oligomers. By "composite material" is meant a combination of two or more differing materials.

The term "curable", as used for example in connection with a curable composition, means that the indicated composition is polymerizable or cross linkable through functional groups, e.g., by means that include, but are not limited to, thermal (including ambient cure), catalytic, electron beam, chemical free-radical initiation, and/or photoinitiation such as by exposure to ultraviolet light or other actinic radiation.

The term "cure", "cured" or similar terms, as used in connection with a cured or curable composition, e.g., a "cured composition" of some specific description, means that at least a portion of any polymerizable and/or crosslinkable components that form the curable composition is polymerized and/or crosslinked. Additionally, curing of a composition refers to subjecting said composition to curing conditions such as those listed above, leading to the reaction of the reactive functional groups of the composition. The term "at least partially cured" means subjecting the composition to curing conditions, wherein reaction of at least a portion of the reactive groups of the composition occurs. The composition can also be subjected to curing conditions such that a substantially complete cure is attained and wherein further curing results in no significant further improvement in physical properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The term "light influencing function", "light influencing property" or terms of like import means that the indicated material, e.g., coating, film, substrate, etc., is capable of modifying by absorption (or filtering) of incident light radiation, e.g., visible, ultraviolet (UV) and/or infrared (IR) radiation that impinges on the material. In alternate embodiments, the light influencing function can be light polarization, e.g., by means of a polarizer and/or dichroic dye; a change in light absorption properties, e.g., by use of a chromophore that changes color upon exposure to actinic radiation, such as a photochromic material; transmission of only a portion of the incident light radiation, e.g., by use of a fixed tint such as a conventional dye; or by a combination of one or more of such light influencing functions.

The term "adapted to possess at least one light influencing property", as used for example in connection with a rigid optical substrate, means that the specified item is capable of having the light influencing property incorporated into or appended to it. For example, a plastic matrix that is adapted to possess a light influencing property means that the plastic matrix has sufficient internal free volume to accommodate internally a photochromic dye or tint. The surface of such a plastic matrix may alternatively be capable of having a photochromic and/or polarizing and/or tinted layer, film or coating appended to it.

The terms "on", "appended to", "affixed to", "bonded to", "adhered to", or terms of like import means that the designated item, e.g., a coating, film or layer, is either directly connected to the object surface, or indirectly connected to the object surface, e.g., through one or more other coatings, films or layers.

The term "ophthalmic" refers to elements and devices that are associated with the eye and vision, such as but not limited to, lenses for eyewear, e.g., corrective and non-corrective lenses, and magnifying lenses.

The term "optical quality", as used for example in connection with polymeric materials, e.g., a "resin of optical quality" or "organic polymeric material of optical quality" means that the indicated material, e.g., a polymeric material, resin, or resin composition, is or forms a substrate, layer, film or coating that can be used as an optical article, such as an ophthalmic lens, or in combination with an optical article.

The term "rigid", as used for example in connection with an optical substrate, means that the specified item is self-supporting.

The term "optical substrate" means that the specified substrate exhibits a light transmission value (transmits incident light) of at least 4 percent and exhibits a haze value of less than 1 percent, e.g., less than 0.5 percent, when measured at 550 nanometers by, for example, a Haze Gard Plus Instrument. Optical substrates include, but are not limited to, optical articles such as lenses, optical layers, e.g., optical resin layers, optical films and optical coatings, and optical substrates having a light influencing property.

The term "photochromic receptive" means that the indicated item has sufficient free volume to permit photochromic material(s) incorporated within it to transform from its colorless form to its colored form (and then revert to its colorless form) to the degree required for commercial optical applications.

The term "tinted", as used for example in connection with ophthalmic elements and optical substrates, means that the indicated item contains a fixed light radiation absorbing agent, such as but not limited to, conventional coloring dyes, infrared and/or ultraviolet light absorbing materials on or in the indicated item. The tinted item has an absorption spectrum for visible radiation that does not vary significantly in response to actinic radiation.

The term "non-tinted", as used for example in connection with ophthalmic elements and optical substrates, means that that the indicated item is substantially free of fixed light radiation absorbing agents. The non-tinted item has an absorption spectrum for visible radiation that does not vary significantly in response to actinic radiation.

The term "actinic radiation" includes light with wavelengths of electromagnetic radiation ranging from the ultraviolet ("UV") light range, through the visible light range, and into the infrared range. Actinic radiation which can be used to cure coating compositions used in the present invention generally has wavelengths of electromagnetic radiation ranging from 150 to 2,000 nanometers (nm), from 180 to 1,000 nm, or from 200 to 500 nm. In one embodiment, ultraviolet radiation having a wavelength ranging from 10 to 390 nm can be used. Examples of suitable ultraviolet light sources include mercury arcs, carbon arcs, low, medium or high pressure mercury lamps, swirl-flow plasma arcs and ultraviolet light emitting diodes. Suitable ultraviolet light-emitting lamps are medium pressure mercury vapor lamps having outputs ranging from 200 to 600 watts per inch (79 to 237 watts per centimeter) across the length of the lamp tube.

The term "tinted photochromic", as used, for example, in connection with ophthalmic elements and optical substrates, means that the indicated item contains a fixed light absorbing agent and a photochromic material. The indicated item has an absorption spectrum for visible radiation that varies in response to actinic radiation and is thermally reversible when the actinic radiation is removed. For example, the tinted photochromic item may have a first characteristic of the light absorbing agent, e.g., a coloring tint, and a second color characteristic of the combination of the light absorbing agent and the activated photochromic material when the photochromic material is exposed to actinic radiation.

The term "dichroic material', "dichroic dye" or terms of like import means a material/dye that absorbs one of two orthogonal plane-polarized components of transmitted radiation more strongly than the other. Non-limiting examples of dichroic materials include indigoids, thioindigoids, merocyanines, indans, azo and poly(azo) dyes, benzoquinones, naphthoquinones, anthraquinones, (poly)anthraquinones, anthrapyrimidinones, iodine and iodates. The term "dichroic" is synonymous with "polarizing" or words of like import.

The term "photochromic dichroic" means a specified material or article that exhibits both dichroic and photochromic properties. In alternate non-limiting embodiments, the specified material can include both photochromic dyes/compounds and dichroic dyes/compounds, or single dyes/compounds that possess both photochromic and dichroic properties.

The term "transparent", as used for example in connection with a substrate, film, material and/or coating, means that the indicated substrate, coating, film and/or material has the property of transmitting light without appreciable scattering so that objects lying beyond are entirely visible.

The term "photochromic amount" means that a sufficient amount of photochromic material is used to produce a photochromic effect discernible to the naked eye upon activation. The particular amount used depends often upon the intensity of color desired upon irradiation thereof and upon the method used to incorporate the photochromic materials. Typically, the more photochromic incorporated, the greater is the color intensity but only up to a certain limit. There is a point after which the addition of any more material will not have a noticeable effect, although more material can be added, if desired.

The coated articles of the present invention comprise a substrate. Substrates suitable for use in the preparation of the coated articles of the present invention can include metals or any of the optical substrates known in the art, including non-plastic substrates such as glass. Suitable examples of plastic substrates include polyol(ally carbonate) monomers, e.g., allyl diglycol carbonates such as diethylene glycol bis(allyl carbonate), which monomer is sold under the trademark CR-39 by PPG Industries, Inc.; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated Bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers. Also suitable are copolymers of such monomers and blends of the described polymers and copolymers with other polymers, e.g., to form interpenetrating network products. The substrate itself may be transparent, or the substrate may possess a light influencing property such as a tint, photochromism and/or dichroism. Also, the substrate may possess at least one light influencing property.

Substartes used most often include polyacrylic, TAC (triacetate cellulose), DAC (diacetate cellulose), poly-allyldiglycol carbonate (ADC), nylon, polyamide, polyurethane urea polymers, PMMA, polyethylene terephthalate, polycarbonate, sulfur-containing polyurethane, and/or sulfur-containing polyurethane(urea).

Optical articles of the present invention include mirrors, active and passive liquid crystal cell elements, magnifying lenses, ophthalmic articles such as plane (without optical power) and vision correcting (prescription) lenses (finished and semi-finished) including multifocal lenses (bifocal, trifocal, and progressive lenses); and ocular devices such as contact lenses and intraocular lenses, sun lenses, fashion lenses, sport masks, face shields, visors and goggles. The optical article may also be chosen from glazings such as windows and vehicular transparencies such as automobile windshields and side windows, display elements and devices. As used herein the term "display" means the visible representation of information in words, numbers, symbols, designs or drawings. Examples of display elements and devices include screens, monitors, and security elements. Examples of security elements include security marks and authentication marks that are connected to a substrate, such as and without limitation: access cards and passes, e.g., tickets, badges, identification or membership cards, debit cards etc.; negotiable instruments and non-negotiable instruments, e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

In particular embodiments of the present invention, when certain optical articles are to be prepared, it may be desirable for the refractive index of the substrate to be at least 1.55. For example the refractive index of the substrate can range from 1.55 to 1.67, such as from 1.55 to 1.65. In such instances, the substrate can comprise polycarbonate, sulfur-containing polyurethanes and/or sulfur-containing polyurethane(ureas). Suitable examples of substrates comprising sulfur-containing polyurethanes and sulfur-containing polyurethane(ureas) can include those described in U.S. Patent Publication No. 2006/0241273A1, filed Feb. 22, 2006, at paragraphs [0010] to [0269], incorporated by reference herein. Also, suitable examples of substrates comprising sulfur-containing polyurethanes and sulfur-containing polyurethane(ureas) can include those prepared from a composition comprised of the thioether-functional oligomeric polythiols described in U.S. Patent Publication No. 2007/0270548A1, filed May 4, 2007 at paragraphs [0053] to [0247], incorporated by reference herein. Further suitable examples of sulfur-containing polyurethanes can include those described in U.S. Patent Publication No. 2007/0142604A1, filed Dec. 16, 2005, at paragraph nos. [0007] to [0020]; [0023] to [0032]; [0034] to [0036]; and [0038] to [0272], all of the cited portions being incorporated by reference herein. Likewise, suitable examples of sulfur-containing polyurethane(ureas) can include those described in U.S. Patent Publication No. 2007/0142606A1, filed Dec. 16, 2005, at paragraph nos. [0006] to [0022]; [0025] to [0034]; [0036] to [0038]; and [0040] to [0296], all of the cited portions being incorporated by reference herein.

A porous sol-gel layer is superposed on at least one surface of the substrate. Sol-gels are dynamic systems wherein a solution ("sol") gradually evolves into a gel-like two-phase system containing both a liquid phase and solid phase, whose morphologies range from discrete particles to continuous polymer networks within the continuous liquid phase. The porous sol-gel layer comprises a tetraalkoxysilane. Because of the sol-gel nature of the composition, the alkoxysilanes are hydrolyzed and they are partially condensed prior to curing of the layer. The hydrolyzed tetraalkoxysilane in the porous sol-gel layer typically comprises tetramethoxysilane and/or tetraethoxysilane.

The porous sol-gel layer is usually deposited onto the substrate from a solution of hydrolyzed tetraalkoxysilane in an alcohol having 1 to 6 carbon atoms, such as a 5 percent by weight solution of hydrolyzed tetraalkoxysilane in isopropanol. The porous sol-gel layer may be applied to the substrate by one or more of a number of methods such as spraying, dipping (immersion), spin coating, or flow coating onto a surface thereof. Immersion is used most often. The porous sol-gel layer is dried to remove alcohol and water solvents. The applied porous sol-gel layer typically has a dry film thickness of less than 1000 nm, such as less than 500 nm, often 100-300 nm.

A sealant layer is superimposed on at least one surface of the porous sol-gel layer. The sealant layer comprises at least one alkyltrihalosilane, such as alkyltrifluorosilanes, alkyltrichlorosilanes, and alkyltribromosilanes. Examples of suitable alkyltrichlorosilanes include methyltrichlorosilane, vinyltrichlorosilane, ethyltrichlorosilane, n-propyltrichlorosilane, i-propyltrichlorosilane, γ-chloropropyltrichlorosilane, i-butyltrichlorosilane, n-butyltrichlorosilane, pentyltrichlorosilane, hexyltrichlorosilane, heptyltrichlorosilane, n-octyltrichlorosilane, i-octyltrichlorosilane, hexadecyltrichlorosilane, 10-undecenyltrichlorosilane, 13-tetradecenyltrichlorosilane, 14-pentadecenyltrichlorosilane, 15-hexadecenyltrichlorosilane, n-octadecyltrichlorosilane and n-hexadecyltrichlorosilane.

The sealant layer may be deposited onto the porous sol-gel layer from a solution of alkyltrihalosilane in an aprotic solvent, such as a 5 percent by weight solution of alkyltrihalosilane in ISOPAR L, a mixture of isoparaffins available from ExxonMobil Chemicals, or in SOLVESSO 100, a mixture of aromatic solvents, also available from ExxonMobil Chemicals. The sealant composition may be applied to the porous sol-gel layer by one or more of a number of methods such as spraying, dipping (immersion), spin coating, or flow coating onto a surface thereof. Immersion is used most often. The sealant is dried to remove solvents.

In certain embodiments of the present invention, it may be desirable to have one or more additional layers interposed between the substrate and the porous sol-gel layer. Such layers may be, for example, any of those known in the art of optical coated articles and may be selected from inter alia, a primer, a tie layer, a UV curable acrylic composition, and an adhesive layer. Any of these additional layers may possess one or more light-influencing properties.

In some cases, a primer coating is applied to the substrate surface prior to application of the porous sol-gel layer. The primer coating is interposed between the substrate and the sol-gel layer, and serves as a barrier coating and/or as an adhesive layer to promote adhesion of the sol-gel layer to the substrate surface. The primer may be applied to the substrate by any known method, e.g., spray, spin, spread, curtain, roll or dip coating; and may be applied to a cleaned and untreated or cleaned and treated, e.g., chemically treated or plasma treated, surface of the substrate. Primer coatings are well known to those skilled in the art. Selection of an appropriate primer coating will depend on the substrate used, i.e., the primer coating must be chemically and physically compatible with the surface of the substrate and subsequently applied layers, while providing the functional benefits desired for the primer coating, i.e., barrier and adhesive properties.

In certain embodiments, the primer coating may be one or several monomolecular layers thick, and can range from 0.1 to 10 microns, such as from 0.1 to 2 or 3 microns. The thickness of the primer can vary between any combination of the aforementioned values, inclusive of the recited values. One suitable primer coating comprises an organofunctional silane, such as methacryloxypropyl trimethoxysilane, a catalyst of a material that generates acid on exposure to actinic radiation, e.g., onium salts, and an organic solvent, such as diglyme or isopropyl alcohol, as described in U.S. Pat. No. 6,150,430, which disclosure is incorporated herein by reference.

A further example of a suitable primer coating is described in U.S. Pat. No. 6,025,026, which describes a composition that is substantially free of organosiloxanes and which comprises organic anhydrides having at least one ethylenic linkage and an isocyanate-containing material. Such disclosure is incorporated also herein by reference. After application of the primer, the substrate may be rinsed with an alcohol such as 2-propanol and then water, and dried for up to half an hour at a temperature ranging from 60° C. to 80° C.

In certain embodiments of the present invention, the coated article further comprises an additional layer interposed between the substrate and the porous sol-gel layer wherein the additional layer is deposited from a curable film-forming composition. The curable film-forming composition is different from the porous sol-gel layer. It is itself a sol-gel system and comprises an alkoxysilane. The alkoxysilane has the general formula $R^1_m Si(OR^2)_{4-m}$, wherein each $R^1$ may be the same or different and represents an organic radical; each $R^2$ may be the same or different and represents a $C_1$ to $C_4$ alkyl group, and m is 0 to 3. $R^1$ can be $C_1$ to $C_6$ alkyl, vinyl, methoxyethyl, phenyl, γ-glycidoxypropyl, or γ-methacryloxypropyl. $R^2$ can be methyl, ethyl, propyl or butyl. Examples of suitable alkoxysilanes include methyl triethoxysilane, 3-glycidoxypropyl trimethoxysilane, and acryloxysilane.

For purposes of the present invention, the alkoxysilane typically is dissolved in an organic solvent, for example, an alcohol, and partially hydrolyzed with water according to the following reaction:

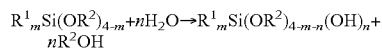

After the alkoxysilane is partially hydrolyzed, a metal oxide and/or metal alkoxide compound may be added. The metal oxide compound can comprise aluminum, titanium, zirconium, cerium, niobium, tantalum, and/or tin. The compound may comprise one or more different metal oxides ($M_xO_y$, wherein x is 1 or 2 and y is 1 to 4) and/or metal alkoxides having the general formula:

wherein M is any of the metals listed above, for example, titanium or zirconium, and $R^3$ represents a low molecular weight monovalent alkyl group such as methyl, ethyl, n-propyl, isopropyl, n-butyl or isobutyl. The metal alkoxide may be in dimer or higher condensed form so long as alkoxy groups remain reactive with silanol groups of the partially hydrolyzed alkoxysilane.

A metal alkoxide reacts with the partially hydrolyzed alkoxysilane to form a network of silicon-oxygen-metal bonds according to the following general reaction:

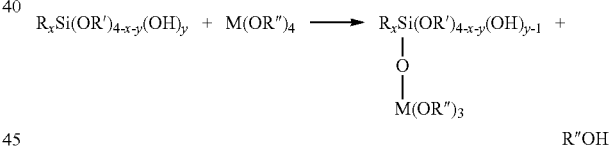

When the metal alkoxide has completely reacted with the partially hydrolyzed alkoxysilane, additional water may be added to hydrolyze the composition, i.e., to convert remaining alkoxy groups of either the alkoxysilane or the metal alkoxide to hydroxyl groups according to the reaction:

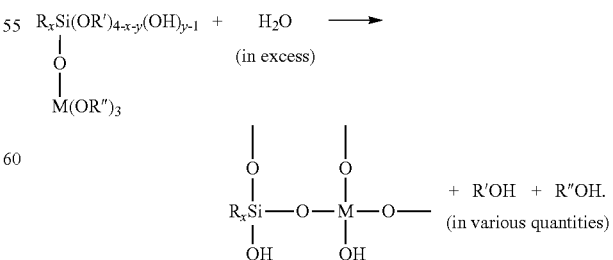

Suitable examples of metal oxide compounds can include cerium oxide, titanium alkoxide, zirconium alkoxide, and/or tin oxide. In a particular embodiment of the present invention, the metal oxide compound comprises cerium oxide and titanium n-butoxide. The metal oxide compound may be used in an amount ranging from 0.1 to 65 percent by weight, such as from 1 to 25 percent by weight based on the total weight of solids in the curable film-forming composition.

The curable film-forming sol-gel compositions are typically waterborne liquids, having a viscosity that allows them to be at least sprayable. The compositions contain water and may additionally contain one or more organic solvents that are at least partially miscible with water, such as methanol, ethanol, n-propanol, isopropanol, n-butanol, and the like.

Particularly suitable compositions that may be used as the curable film-forming sol-gel composition are those sold under the name HI GARD, available from PPG Industries, Inc.

The curable film-forming sol-gel compositions and any of the additional layers interposed between the substrate and the porous sol-gel layer can include a variety of optional ingredients and/or additives that are somewhat dependent on the particular application of the final coated article. For example, the composition may be tinted and contain a colorant, and/or may exhibit a light influencing property. Other optional ingredients include rheology control agents, surfactants, initiators, catalysts, cure-inhibiting agents, reducing agents, acids, bases, preservatives, free radical donors, free radical scavengers and thermal stabilizers, which adjuvant materials are known to those skilled in the art.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the compositions of the present invention.

Example colorants include pigments, dyes and tints, such as those listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Examples of suitable dyes can include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Photochromic dyes are suitable for use in the various layers of the coated articles of the present invention, either alone or in combination with other colorants. The photochromic materials can include the following classes of materials: chromenes, e.g., naphthopyrans, benzopyrans, indenonaphthopyrans and phenanthropyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline)naphthoxazines, spiro(indoline)pyridobenzoxazines, spiro(benzindoline)pyridobenzoxazines, spiro(benzindoline)naphthoxazines and spiro(indoline)benzoxazines; mercury dithizonates, fulgides, fulgimides and mixtures of such photochromic compounds. Such photochromic compounds and complementary photochromic compounds are described in U.S. Pat. No. 4,931,220 at column 8, line 52 to column 22, line 40; U.S. Pat. No. 5,645,767 at column 1, line 10 to column 12, line 57; U.S. Pat. No. 5,658,501 at column 1, line 64 to column 13, line 17; U.S. Pat. No. 6,153,126 at column 2, line 18 to column 8, line 60; U.S. Pat. No. 6,296,785 at column 2, line 47 to column 31, line 5; U.S. Pat. No. 6,348,604 at column 3, line 26 to column 17, line 15; and U.S. Pat. No. 6,353,102 at column 1, line 62 to column 11, line 64. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Other photochromic materials that can be used include organo-metal dithiozonates, i. e., (arylazo)-thioformic arylhydrazidates, e. g., mercury dithizonates which are described in, for example, U.S. Pat. No. 3,361,706, at column 2, line 27 to column 8, line 43; and fulgides and fulgimides, e. g., the 3-furyl and 3-thienyl fulgides and fulgimides, which are described in U.S. Pat. No. 4,931,220, at column 1, line 39 through column 22, line 41. Likewise, the curable film forming compositions of the present invention also can comprise photochromic-dichroic dyes and/or conventional dischroic dyes as are known in the art.

The curable film-forming sol-gel composition may be applied to the substrate by one or more of a number of methods such as spraying, dipping (immersion), spin coating, or flow coating onto a surface thereof. Immersion is used most often. The curable film-forming composition is dried to remove alcohol and water solvents. After subsequent application of the porous sol-gel layer, it is then heated to a temperature of 120° to 135° C. for up to three hours, to promote the continued condensation polymerization of the composition. The curable film-forming sol-gel composition demonstrates a dry film thickness of 2 to 6 microns, often 2 to 4 microns. The sealant layer is applied after the heating step.

The coated articles of the present invention demonstrate excellent abrasion resistance. A Bayer Abrasion Test can be used to determine surface abrasion resistance. The resistance of a product to abrasion is quantified by measuring the haze of the test sample after abrasion and comparing that value to that measured on a control sample, e.g., a plano lens prepared from diethylene glycol bis(allyl carbonate) in the case of an ophthalmic product. Usually, measurements are made on multiple pairs of test sample/controls, e.g., 5 pairs, to ensure statistically significant results. The samples and controls to be tested are cleaned with mild soapy water, rinsed with water and then dried with air. The test samples and controls are conditioned for a minimum of 2 hours, while the abrasive material is conditioned for a minimum of 24 hours, it a temperature and humidity controlled environment (23+/−3° C. and 50+/−10% relative humidity). The light transmission of the test sample and control at 550 nm is measured using a Haze-Gard Plus device. The test sample and control are mounted on the Bayer Abrader and the abrasion medium, e.g., alumina (Norton ZF E-327 grit #12), placed in the pan of the Abrader. When lenses are tested, they are mounted convex side down. The Abrader is operated for 6 minutes at a rate of 100 cycles per minute for a total of 600 cycles. Both the test samples and controls are cleaned with mild soapy water, rinsed and dried with air. The haze of the test samples and controls are again measured at 550 nm using the Haze Gard Plus device. The haze gain is calculated from the difference in light transmission values before and after abrading. The Bayer Haze Gain Ratio is determined by dividing the measured haze of the control by that of the test sample (Haze Gain Ratio=Haze (control)/Haze (test sample).

The Tumble test is an abrasion test that was created based on actual clinical study data of normal wear for glass, uncoated plastic lenses and coated plastic lenses. It equates to about one year of normal wear. The Tumble Test is based on abrasion by a number of different types of media in a barrel that is mixed with a natural sawdust-type material. As test samples fall repeatedly in the barrel a natural wear type of abrasion is imparted. The length of the test for the front surface of the test sample is 20 minutes. Important also is that the ISO Reference Lens, which is an uncoated CR-39® lens that has been produced in tightly controlled conditions to reduce deviation in cure, is used as the control lens. Three are used in each test. Following the test the three lenses are compared. Each had a hazemeter measurement completed prior to abrasion and another following abrasion. The resulting haze gain of the test sample is divided into the resulting haze of the ISO Reference lens to establish a ratio of how many more times abrasion resistant the test lens is compared to the ISO Reference lens or uncoated hard resin lens. The ISO lens is used as the standard for all lens materials and coatings upon which to base results.

The following examples are intended to illustrate various embodiments of the invention, and should not be construed as limiting the invention in any way.

EXAMPLES

Test samples were prepared using TRIVEX substrates, available from PPG industries, Inc. For each example, HI-GARD 1080 coating composition, available from PPG Industries, Inc., was applied to a substrate. In a comparative example, the coating composition was cured at 120° C. for 3 hours and no additional layers were applied. In an example according to the present invention, a 5 percent by weight solution of tetraethoxysilane in isopropyl alcohol was prepared and applied by immersion to a test substrate that had been coated with HI-GARD 1080. The test substrate was then cured at 120° C. for 3 hours. Then a 5 percent by weight solution of octadecyltrichlorosilane in ISOPAR L was prepared and applied by immersion to the coated substrate and any excess was wiped off. The test substrates were subjected to the Bayer test and Tumble test as described above. Test substrates were further subjected to QUV, Artificial Sweat, and Hot Water tests, the protocol of which are explained below, after which they were subjected to the Bayer Abrasion Test. Bayer Abrasion ratios are reported in the following table.

Artificial Sweat
Procedure
1. Edge the sample with adequate shape to remove coating excess areas (i.e. lens edge)*
2. In 1 L glass beaker, mix until complete dissolution 100 grams of sodium chloride and 50 grams of lactic acid in 850 grams of deionized water
3. Heat up the solution to 50° C.
4. Hold on the samples on the suitable holders
5. Dip the samples at 50° C. for 5 hours under vigorous stirring.
6. After 5 hours, remove the samples and wash with DI water.
Clean and dry with a soft cloth.

Hot Water Test
Procedure
1. Edge the sample with adequate shape to remove coating excess areas (i.e. lens edge)*
2. Fill 1 L beaker with DI water
3. Heat up the solution to 90° C.
4. Hold on the samples on suitable holders
5. Dip the samples at 90° C. for 5 hours under vigorous stirring.
6. After 5 hours, remove the samples and wash with DI water.
Clean and dry with a soft cloth.

QUV Panel—Accelerated Weathering Test
Procedure
1. Setup the instrument by mounting UV B type lamp (313 nm wavelength)
2. Open water inlet and check instrument bottom side for water level
3. Setup time counter in order to have alternate cycles of 4 hours for UV exposure followed by 4 hours of water condensation.
4. Load experimental and reference samples onto the proper holder with convex side looking towards internal side of the machine
5. Switch on the QUV Panel
6. Test period is 5 days (120 hours)
7. After 5 days, switch off the instrument and download the samples Note that Condensation and UV exposure temperature is controlled by instrument in order to be in the range between 45-55° C.

The Bayer Abrasion Resistance Index (BARI), listed in the Table, was calculated by dividing the percent haze of an uncoated test Control sample made of TRIVEX by the percent haze of the coated test sample. The resulting number is an indication of how much more abrasion resistant the coated test sample is as compared to the uncoated test square. The haze and transmission results before and after abrasion testing were measured with a Hunter Lab Model DP25P Colorimeter.

TABLE

| Example | Tumble Ratio | BARI | QUV | Artificial Sweat | Hot Water |
| --- | --- | --- | --- | --- | --- |
| Comparative | N/A | 8 | 1 | 1 | <1 |
| 1 | 9.3 | >30 | >30 | >30 | 1.5 |

The results in the Table show that the substrates coated in accordance with the present invention were more abrasion resistant that the Comparative sample (prepared from TRIVEX and coated with HI-GARD 1080), and demonstrated better weathering and water resistance.

Whereas particular embodiments of this invention have been described above for purposes of illustration, it will be evident to those skilled in the art that numerous variations of the details of the present invention may be made without departing from the scope of the invention as defined in the appended claims.

What is claimed is:

1. An optical article comprising:
   (a) a substrate;
   (b) a porous sol-gel layer superimposed on at least one surface of the substrate; wherein the porous sol-gel layer comprises a hydrolyzed tetraalkoxysilane; and
   (c) a sealant layer superimposed on at least one surface of the porous sol-gel layer;
   wherein the sealant layer consists essentially of an alkyltrihalosilane selected from the group consisting of methyltrichlorosilane, vinyltrichlorosilane, ethyltrichlorosilane, n-propyltrichlorosilane, i-propyltrichlorosilane, γ-chloropropyltrichlorosilane, i-butyltrichlorosilane, n-butyltrichlorosilane, pentyltrichlorosilane, hexyltrichlorosilane, heptyltrichlorosilane, n-octyltrichlorosilane, i-octyltrichlorosilane, hexadecyltrichlorosilane, 10-undecenyltrichlorosilane, 13-tetradecenyltrichlorosilane, 14-pentadecenyltrichlorosilane, 15-hexadecenyltrichlorosilane, n-octadecyltrichlorosilane and n-hexadecyltrichlorosilane; and
   (d) an additional layer interposed between the substrate and the porous sol-gel layer, said additional layer being different from the porous sol-gel layer (b), deposited from a curable film-forming sol-gel composition comprising a hydrolyzed alkoxysilane,
   wherein the curable film-forming sol-gel composition further comprises a metal oxide compound containing cerium and optionally at least one of aluminum, titanium, zirconium, niobium, tantalum, and/or tin.

2. The optical article of claim 1 wherein the substrate comprises a plastic, glass, or metal.

3. The optical article of claim 1, further comprising one or more additional layers selected from a primer, a tie layer, a UV curable acrylic composition, a sol-gel coating composition different from the porous sol-gel layer, and/or an adhesive layer, interposed between the substrate and the porous sol-gel layer.

4. The optical article of claim 1, wherein the porous sol-gel layer has a dry film thickness of less than 1000 nm.

5. The optical article of claim 1 wherein the hydrolyzed tetraalkoxysilane in the porous sol-gel layer comprises tetramethoxysilane and/or tetraethoxysilane.

6. The opticle article of claim 1, wherein the curable film-forming sol-gel composition further comprises a metal alkoxide reactive with the hydrolyzed alkoxysilane.

7. The opticle article of claim 1, wherein the alkoxysilane in the curable film-forming sol-gel composition comprises 3-glycidoxypropyl trimethoxysilane.

8. The opticle article of claim 1, wherein the substrate comprises polyacrylic, TAC (triacetate cellulose), DAC (diacetate cellulose), poly-allyldiglycol carbonate (ADC), nylon, polyamide, polyurethane urea polymers, PMMA, polyethylene terephthalate, polycarbonate, sulfur-containing polyurethane, and/or sulfur-containing polyurethane(urea).

9. The optical article of claim 1, wherein said optical article comprises ophthalmic elements, display elements, windows, mirrors, and/or active and passive liquid crystal cell elements and devices.

10. The optical article of claim 9, wherein the optical article is an ophthalmic element comprising corrective lenses, non-corrective lenses, contact lenses, intra-ocular lenses, magnifying lenses, protective lenses, or visors.

11. The optical article of claim 9, wherein the optical article is a display element comprising screens, monitors, and security elements.

12. The optical article of claim 9 wherein the substrate has a refractive index of at least 1.55.

* * * * *

UNITED STATES PATENT AND TRADEMARK OFFICE
CERTIFICATE OF CORRECTION

PATENT NO. : 10,185,057 B2
APPLICATION NO. : 13/672033
DATED : January 22, 2019
INVENTOR(S) : James P. Colton et al.

Page 1 of 1

It is certified that error appears in the above-identified patent and that said Letters Patent is hereby corrected as shown below:

In the Claims

Column 14, Line 10, Claim 6, delete "opticle" and insert -- optical --

Column 14, Line 13, Claim 7, delete "opticle" and insert -- optical --

Column 14, Line 16, Claim 8, delete "opticle" and insert -- optical --

Signed and Sealed this
Twenty-first Day of May, 2019

Andrei Iancu
*Director of the United States Patent and Trademark Office*